United States Patent
Kelkar et al.

(10) Patent No.: US 9,805,322 B2
(45) Date of Patent: Oct. 31, 2017

(54) APPLICATION BLUEPRINT AND DEPLOYMENT MODEL FOR DYNAMIC BUSINESS SERVICE MANAGEMENT (BSM)

(75) Inventors: Suhas A. Kelkar, Pune, IN (US); Abhijit Sharma, Pune (IN); Karanbir Gujral, Pune (IN); Manikantan Narender Nath, Pune (IN); Steve Wong, Markham (CA); Rohit Kashikar, Pune (IN)

(73) Assignee: BMC Software, Inc., Houston, TX (US)

( * ) Notice: Subject to any disclaimer, the term of this patent is extended or adjusted under 35 U.S.C. 154(b) by 1231 days.

(21) Appl. No.: 12/847,949

(22) Filed: Jul. 30, 2010

(65) Prior Publication Data

US 2011/0321033 A1 Dec. 29, 2011

Related U.S. Application Data

(60) Provisional application No. 61/358,228, filed on Jun. 24, 2010.

(51) Int. Cl.
| | |
|---|---|
| *G06Q 10/06* | (2012.01) |
| *G06F 9/44* | (2006.01) |
| *G06F 9/445* | (2006.01) |
| *G06F 11/34* | (2006.01) |

(52) U.S. Cl.
CPC ........... *G06Q 10/0631* (2013.01); *G06F 8/35* (2013.01); *G06F 8/60* (2013.01); *G06F 8/71* (2013.01); *G06F 9/44505* (2013.01); *G06F 11/3442* (2013.01)

(58) Field of Classification Search
CPC ...... G06Q 10/00–10/30; G06Q 20/00–20/425; G06Q 30/00–30/08; G06F 8/00–8/78; G06F 9/00–9/548; G06F 11/00–11/3696
USPC ............................. 705/50–79; 717/100–178
See application file for complete search history.

(56) References Cited

U.S. PATENT DOCUMENTS

| | | | |
|---|---|---|---|
| 7,472,374 B1* | 12/2008 | Dillman et al. | 717/102 |
| 7,735,062 B2* | 6/2010 | de Seabra e Melo et al. | 717/120 |
| 8,219,968 B2* | 7/2012 | O'Brien | 717/104 |
| 2003/0182652 A1* | 9/2003 | Custodio | 717/122 |
| 2005/0192921 A1* | 9/2005 | Chaudhuri | G06F 17/30368 |
| 2008/0244600 A1* | 10/2008 | Wong et al. | 718/104 |
| 2011/0004564 A1* | 1/2011 | Rolia | G06Q 10/06 705/348 |

(Continued)

*Primary Examiner* — Mohammad A Nilforoush
(74) *Attorney, Agent, or Firm* — Brake Hughes Bellermann LLP

(57) ABSTRACT

Disclosed are systems and methods for model based provisioning of applications and servers (both physical and virtual) to execute provisioned applications in a reliable and repeatable manner. Several aspects of a complex application management including compliance, change tracking, monitoring, discovery, processing steps, CMDB integration are disclosed within a comprehensive hierarchy of definition templates forming a model. This model can then be used at provisioning time to instantiate a compliant instance of the provisioned application. This model can also be used at run-time for managing run-time aspects of the provisioned application. Additionally, the model based approach can help track applications even when or if applications drift from their intended design and policies for use.

19 Claims, 3 Drawing Sheets

(56) References Cited

U.S. PATENT DOCUMENTS

2011/0099532 A1* 4/2011 Coldicott et al. ............ 717/105

* cited by examiner

APPLICATION BLUEPRINT AND DEPLOYMENT MODEL FOR DYNAMIC BUSINESS SERVICE MANAGEMENT (BSM)

CROSS REFERENCE TO RELATED APPLICATIONS

This application claims priority to U.S. Provisional Application No. 61/358,228 entitled "Application Blueprint and Deployment Model for Dynamic Business Service Management (BSM)" by Suhas Kelkar et al., filed 24 Jun. 2010 which is hereby incorporated by reference in its entirety.

BACKGROUND

This disclosure relates generally to the field of computer application management using a blueprint and deployment model. More particularly, but not by way of limitation, this disclosure refers to a method and system for comprehensive provisioning and management of computer applications in a dynamic Business Service Management (BSM) environment while additionally addressing change tracking of configurations, incident management, application compliance, application monitoring, and process management.

In today's corporate computing environment vast amounts of computer resources (e.g., storage, processing capacity, network infrastructure) may be available to corporations. Also, certain business services are either supported by or made available through internal and external computer resources. Internal resources can include computing capacity connected to an intranet and external resources can include internet based resources made available on demand to a subscriber (e.g., cloud computing resources).

One goal of a corporation's information technology (IT) management is capacity planning. Capacity planning, in a computer system context, is a discipline to ensure enough resources are available to handle a maximum amount of workload at a given time without requiring the corporation to purchase and maintain excess computer resources. Capacity planning is typically performed using both historical data about computer resource loads and forecast data pertaining to increases in use of business services or business applications.

Another goal of a corporation's technology management relates to BSM. At a very high level, BSM can be thought of as abstracting the actual information technology infrastructure (i.e., IT components) so that a view can be presented reflecting performance of a business service without regard to the actual IT components used to support the business service at a given point in time. For example, IT components often have built in redundancy so that if a single component fails a redundant component can take over on the fly resulting in no direct impact to a business service being supported by the particular IT component that has failed. In other words, a primary goal of BSM is to manage the business at a level less concerned with the technical nature of the IT components supporting the business. Also note that an IT component can refer to an actual hardware component, a software component, or a combination thereof.

Because of the complexity of today's corporate computing environment, it would be desirable to create a model driven approach to many of the aspects of systems management. Prior art provisioning techniques can be very manual and time consuming processes. As such, they can also be error prone and not necessarily repeatable in a reliable manner. Additionally, many organizations are struggling with knowing what applications are used by whom and for what purpose.

SUMMARY

Disclosed are methods and systems of supporting a business service within a dynamic business service management (BSM) environment across a plurality of computer systems. In one embodiment this comprises obtaining a blueprint wherein the blueprint defines one or more attributes of a computer application; obtaining a deployment model corresponding to the computer application and associated with the blueprint wherein the deployment model defines one or more attributes of the computer application; augmenting the blueprint with at least some attributes defined by the deployment model to create an augmented model; determining resources capable of supporting the augmented model; and deploying an instance of the application to support a business service on the determined resources wherein the resources were determined based on the augmented model.

In another disclosed embodiment, a method and system for instantiating an application to support a business service as part of a dynamic business service management environment is disclosed. In this embodiment, a computer receives information pertaining to an augmented model from another computer acting as a provisioning engine/server and acts on the information to provision the defined application. One embodiment of this method comprises receiving a business service model definition representing deployment requirements of an application wherein the application is part of a business service model; allocating resources responsive to the deployment requirements; and instantiating the application on the allocated resources. Optionally, the business service model definition can be retrieved from a configuration management database (CMDB). As another option, resources may be allocated from resource pools and used for the duration of the provisioned application and then returned to the resource pools.

DETAILED DESCRIPTION

Figure 1:
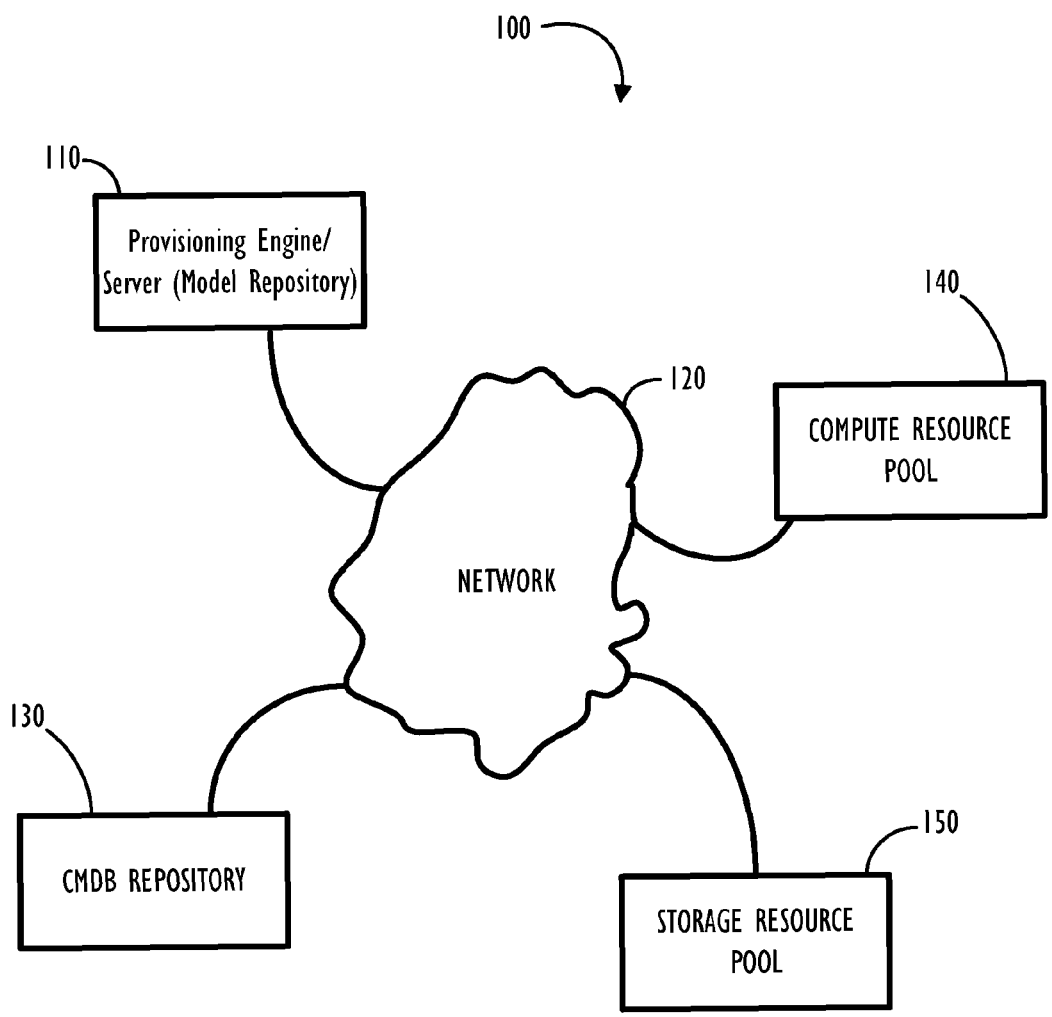
FIG. 1 shows a provisioning server in a dynamic BSM environment with a CMDB and resource pools according to one disclosed embodiment.

This disclosure relates to systems and methods for model based provisioning of applications and servers (both physical and virtual) to execute provisioned applications. Prior art provisioning techniques can be very manual and time consuming processes. As such they can also be error prone and not necessarily repeatable in a reliable manner. Several aspects of a complex application like compliance, change tracking, monitoring, discovery, processing steps, Configuration Management Database (CMDB) integration, etc. should preferably be defined and modeled along with the application so that they can be tracked in a reliable manner. Typically in the prior art, these aspects are normally handled by many separate products which do not talk to each other. As a result, there may not be any centralized visibility into the requirements of an application. Also, there is no centralized way to govern these aspects. Additionally, many organizations are struggling with knowing what applications are used by whom and for what purpose. A model based approach can help track applications even when or if applications drift from their intended design and policies for use.

A blueprint (BP) can be defined to act as a model for an application. The BP for a particular application can also be augmented with other information from more details models (e.g., DM) to define multiple deployment intents for the particular application modeled by the BP. An application BP can define necessary variables and skeleton/topology of an application. Additionally, the BP can define monitoring, compliance, change tracking, discovery, and processing steps. An application BP can be thought of as a portable and complete definition for a given application. The BP describes the application's needs in a logical fashion.

A deployment model (DM) on the other hand is a model that defines how the logical pieces from the BP are mapped to a particular data center environment and for particular deployment intent. There may be only one BP per application and n number of DMs can be derived or defined as needed. This core modeling method can alleviate the problems mentioned in the previous section (e.g., it may enable automating provisioning of application instances based on the BP and DM). The models can also include, in a centralized way, several important aspects related to the application, like compliance, change tracking, monitoring, discovery, processing steps for provisioning, CMDB integration, etc. It may also allow tracking of any drift in reality from the model as well as a centralized way to govern these aspects related to the application.

Additionally, management is key in cloud computing. Proper governance, compliance, audits, and change control over cloud assets are necessary for continued adoption and the move from physical to virtual. The treatment of a cloud asset can be handled in a similar manner to treatment of physical asset. However, a significant challenge is in the sheer number of virtual assets and configuration items in an IT environment. The introduction of the Application Blueprint and Deployment Model represent, a step forward in the ability to scale to managing resources in the cloud.

This disclosure also relates to an enhanced Service Request Management (SRM) capability through the combination of the attributes of the Application Blueprint and Deployment Model and new features in the Service Request Management application that allows for Dynamic BSM to be realized. In some embodiments this disclosure, Dynamic Service Request Management can solve the problem of collecting application and process specific attributes from the end user without requiring unmanageable systems administration from a Service Catalog Manager. Some of the disclosed embodiments may also allow data collection questions to be posed raw for a technically inclined user or put through a translation engine to pose the same questions in a business centric and non-technical fashion. For example, small/medium/large deployment may be offered as options to a non-technical user, while specific questions, down to the memory, number of servers, db choices, etc. may be offered to a technical user.

The application BP and the DM can also cover several other important aspects of the application as extensions to the core model:

Compliance Requirements of the application and the products comprising it, e.g., Defense Information Security Agency (DISA) and Payment Card Industry (PCI) compliance regulatory requirements are defined in abstract terms in the model for the Oracle product which forms part of an application's Database (DB) Tier.

Monitoring Requirements of the application and the products comprising it, e.g., the monitoring profiles comprising the key performance indicators (KPI) related to the Oracle DB whose deployment intent is OLTP. This is also defined in abstract terms.

Change Tracking Requirements of the application and the products comprising it, e.g., whenever a particular application is provisioned, it is to be change tracked with manual approvals and with individual change tasks being created for each tier being provisioned. This too is defined in abstract terms for this application. This can tie into an ITSM compliant change tracking product.

Discovery Requirements or Signature of the application which can enable discovery of pre-existing instances of the application in the data center—thus enabling them to be brought under governance as well.

Process Orchestration definition in high level portable form for several things like provision steps, scale out, remediation, etc.

Also disclosed is an enhanced Change Management process through the combination of the attributes of the Application Blueprint and Deployment Model and new features in Change Management application and processes that allow for Dynamic BSM to be realized. Dynamic Change Management can help solve the problem of manually mapping and configuring an incredibly large number of change processes, templates, approvals, etc. for different applications and configurations for each variation of cloud deployment.

Referring now to FIG. 1, a block diagram illustrates an example of a dynamic BSM environment 100. Environment 100 includes a provisioning server 110 connected to a network 120. Also connected to network 120 are a CMDB repository 130 and computer system resource pools (i.e., compute resource poll 140 and storage resource pool 150). While each of these logical functions is shown in a single block multiple physical computer resources can be used to implement the functions illustrated in a single block, of the diagram. Additionally, multiple logical functions may be combined into a single physical computer. In particular, a model repository shown in block 110 may be relocated from being co-existent with the Provisioning Engine/Server and be placed on another computer storage resource such as CMDB repository 130. Further, network 120 represents a method of communicatively coupling computer devices and may include a WAN, LAN, intranet, or internet, and either wired or wireless network communication capabilities.

Figure 2:
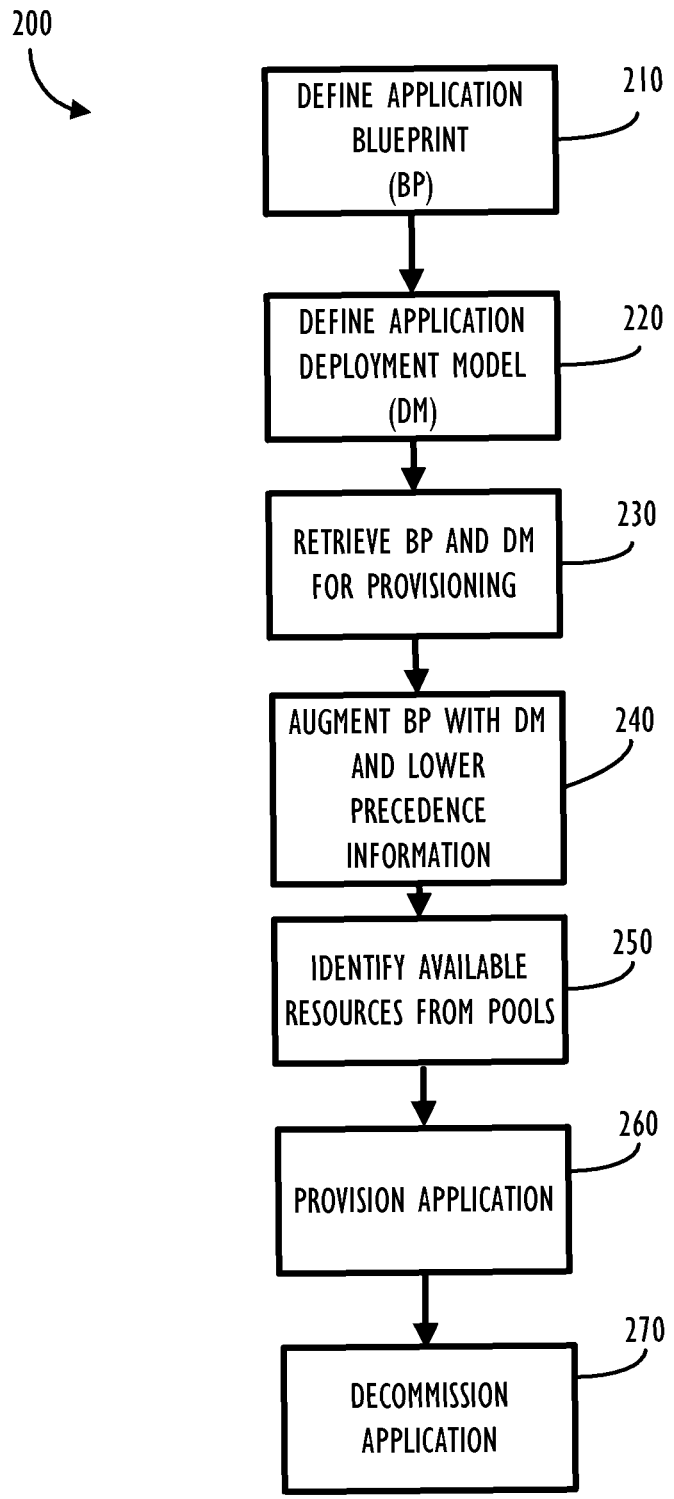
FIG. 2 shows, in flow chart form, an example process flow of provisioning and decommissioning an application based on one embodiment of the disclosed model.

Referring now to FIG. 2, a flow chart depicting process 200 for provisioning and decommissioning an application according to one disclosed embodiment is shown. Actions of each of the steps in process 200 will be further explained by way of a detailed example below. Beginning at block 210, a blueprint (BP) defining attributes of a computer application is defined by either a system administrator or an independent software vendor (ISV). Block 220 represents a definition of a deployment model (DM), which is a lower level and more detailed definition of a computer application corresponding to an associated BP. There can be many DMs for a single BP. Attributes of a DM can have a higher precedence and override a corresponding attribute in a BP or can be an additional attribute not defined at the level of a BP. Next, at block 230, a provisioning engine 110 retrieves a DM and a corresponding BP to perform provisioning of the defined computer application. Block 240 represents an augmentation step where attributes of the retrieved BP and DM (along with any other lower level definition files) are augmented to create an augmented model, taking into account any precedence rules defined in the system. Block 250 represents an allocation of resources from resource pools to instantiate an instance of the application as defined in the augmented model. Block 260 represents a provisioning (instantiation) of the application in accordance with the augmented model. After the provisioned application has completed its function or after an elapsed period of time, control could flow to block 270 where the provisioned application is decommissioned (removed) thereby freeing the allocated resources and allowing the resources to be reclaimed into the resource pools.

Given this high level overview, each of these and other aspects will now be discussed in more detail in the following sections, each with their own heading. Example information files are shown in Extensible Markup Language (XML) format to illustrate how information from the models may be stored. The use of XML is an example and other formats for storing data may be used without departing from the concepts disclosed. Further, the elements (i.e., data fields) shown in the XML samples are also only used as examples. Different or additional fields may be used to build a complete model for a given corporate environment.

Blueprint and Deployment Model

The disclosed blueprint (BP) and deployment model (DM) can enable a model driven approach to several aspects related to applications in a complex, heterogeneous data center. These aspects include but are not limited to automated provisioning and configuration, dynamic elasticity in terms of scale out and scale in steps, compliance, change tracking, monitoring, discovery, processing steps for custom actions, deploy, configuration, startup, etc. Each of these aspects can also be implemented with an eye toward comprehensive CMDB integration. Comprehensive CMDB integration means, at least in part, an ability to retrieve and store information from/to a CMDB to avoid repetitive storage and maintenance of configuration information.

A BP document models aspects of an application, for example, the application's structure in terms of components or tiers, specific product choices within those application tiers, provisioning steps for the application, compute, network, storage constraints, context variables, allowed topologies, etc. Additionally, in many cases the BP will have high level details like bare topology representing the high level architecture, leaving the details (e.g., provisioning steps) to the lower level DMs. Because a BP is expected to change over time, it is desirable to have tracking capability built into the BP model, such as a version number of the BP and a global unique identifier as a key reference to the particular BP.

A DM document conforms to and augments a BP. The DM can describe specifics about deployment intent for the modeled application. For example, one DM for quality assurance (QA) and another DM for production can differ in terms of their usage. For instance, the QA model can place both web and DB tier on the same machine while the production model may need separate machines for individual tiers. The DM can define resource pool(s) and matching criteria to acquire suitable resources, specific provisioning steps for a product at various lifecycle stages and other things. The DM can augment and "fill in the blanks" from a BP definition. In one embodiment, third party vendors and others in the software marketplace can supply a BP, and an administrator for a particular environment can then provide a DM corresponding to the requirements of the particular usage.

By way of example, a multi-tier web application can have both a database tier and a web tier. Choices for an administrator at the database tier can include a selection of databases and possibly database versions (e.g., Oracle 8.0, Oracle 9.0, MySQL 4.0, MSSQL). Choices for an administrator at the web tier can similarly identify a particular web server to support the application. The BP therefore allows specification of permitted topologies, because not all possible product choices may be supported by a particular application.

Blueprint Model

As stated above, a disclosed embodiment of a BP is shown using XML. An example of a simplified BP structure is shown below. Note that the example BP is divided into different elements to define information required at provisioning of the corresponding application.

```
<adf version="1.0" id="My App Blueprint">
    <variables>...</variables>
    <references>...</references>
    <networks>...</networks>
    <storages>...</storages>
    <deploymentOptions>...</deploymentOptions>
    <application>...</application>
    <deploymentPaths>...</deploymentPaths>
</adf>
```

The variables section can define global variables with default values optionally specified. Additionally, some variables may be user input to be specified by the user at the time of deployment. The values of some of them can be determined at runtime, while values of some of these variables may be overridden by corresponding variables in the DM at the time of provisioning via augmentation (i.e., merging of information taking into account order of precedence). These variables can be used during the provisioning process to pass context around to the various orchestration steps (e.g., the DB tier network address is stored in a runtime variable and the app tier accesses this variable and sets the appropriate configuration in its db configuration files to point to the db). Variables can be of type in, out, or inout and may be passed as context to executing scripts/packages at provisioning time. The out or inout variables may also be changed in the course of provisioning and returned to the deployment engine, which can further pass the variable to subsequent processing steps. A more detailed variables section example is shown below.

```
<variables>
    <variable
        description="maxThreads"
        id=" maxThreads "
        type="xs:int"
        isUserInput="true"
        isRuntime="false">75</variable>
    ...
</variables>
```

The references section can list external references that may be required at the time of various actions driven by the BP. These can include content in the form of application packages like Apache RPM, J2EE application packaged as a web application archive (WAR), full stack Image files, OVF files, VM templates, scripts, etc. DMs derived from a BP inherit all these packages and may add via augmentation more packages to the existing references defined in BP. It is desirable that external references be identified uniquely within each BP and DM. An example of a references section is shown below.

```
<references>
    <reference id="ApacheTomcatInstallPackage"
            type="blpackage">
        <configuration>
            <bl foreignid="/App-Install
BlPackages/Tomcat/tomcat.zip"/>
        </configuration>
    </reference>
    <reference id="VM-Win2k3-AD-Server"
            type="OVF">
        <configuration>
            <ovf>
                <url>http://myrepository/Win2k3-
AD-Server.ovf</url>
            </ovf>
        </configuration>
    </reference>
    ...
</references>
```

The networks section can describe the logical networks that are used in the application. These logical networks can map to "real" networks at the time of deployment. The DM can then associate these logical network definitions to actual network resource pools at provisioning time. Express constraints like "Should be able to connect to the Internet," "should be connected to this switch," etc. can be defined as required. The network definitions can be used to indicate which networks need to be connected as a condition for deployment. An example of a networks section is shown below.

```
<networks>
    <network id="DMZNetwork">
        <description>
            The network that will connect the web
server with the outside world
        </description>
        <constraints>
            <constraint>
                <!--Reference to a script that
checks if this network is accessible over the
internet -->
                <reference id="script-check-is-
public"/>
            </constraint>
            ...
        </constraints>
    </network>
    <network name="Production network">
        <description>
            The network that will connect the web
server with the database
        </description>
        <constraints>...</constraints>
    </network>
    <network name="Management network">
        <description>
            The network that will connect all
components together for management
        </description>
        <constraints>...</constraints>
    </network>
</networks>
```

The storage section can similarly describe the principal logical storage options used by the application. The example shown below describes the DB principal storage to be used by the DB tier component (products) to store its files. It could also specify constraints and details like size: 1 Storage Unit 100 GB, reliability; RAID 5. The DM can then associate these logical storage definitions to actual storage resource pools at the time of provisioning. An example of the storages section is shown below.

```
<storages>
    <storage id="DB Principal storage">
        <description>
            The storage that will be used for the
DB files .. 1 Storage Unit 100 GB RAID 5
        </description>
        <constraints>
            <constraint>...</constraint>
            ...
        </constraints>
    </storage>
    <storage name="Web Tier storage">
        <description>
            The storage that will be used by the
web server .. commodity
        </description>
        <constraints>...</constraints>
    </storage>
</storages>
```

The deployment options section can specify the deployment options for the application. An example of a deployment options section is shown below.

```
<deploymentOptions>
    <configuration id="minimal">
        <description>Deploy service with minimal
resource use</description>
    </configuration>
    <configuration id="standard">
        <description>Deploy service with standard
resource use</description>
    </configuration>
</deploymentOptions>
```

The application description section can describe an application in terms of its various identification requirements, initialization/termination requirements, and component requirements, among other things. An application description can define aspects like:

Application Info: Base information about the application

Version Info: Version information about the application

Annotations: Annotations for the application, this could include information such as support information and any contact information that could be independently added by third parties Startup: The Startup section describes how and in what order components will start Shutdown: The Shutdown section describes how and in what order components will be shutdown Components: describes the various components or tiers/modules like web tier, DB tier, etc comprising product choices that can be used to define the topology of the application An example of the structure of an application description example is shown below.

```
<application>
    <applicationInfo>...</applicationInfo>
    <versionInfo>...</versionInfo>
    <annotations>...</annotations>
    <startup>...</startup>
```

```
<shutdown>...</shutdown>
<components>...</components>
</application>
```

The application information section can describe high level information about the application like the name, description, URL, and various attributes of interest associated with the application. An example of an application information section is shown below.

```
<applicationInfo>
    <name>My App Web Portal</name>
    <description>Describes product information for
the application</description>
    <vendor>XYZ</vendor>
    <productUrl>http://www.xyz.com/myapp</productUrl>
    <vendorUrl>http://www.xyz.com/</vendorUrl>
    <attributes>
        <attribute>
            <name>category</name>
            <valueSet>
                <value>finance</value>
                <value>insurance</value>
            </valueSet>
        </attribute>
        ...
    </attributes>
</applicationInfo>
```

The versioning information section can describe version related information for the application as a whole. An example of a version information section is shown below.

```
<versionInfo>
    <version>4.5 (Versioning needs a separate
section)</version>
    <fullVersion>4.5-b4523</fullVersion>
    <releaseName/>
    <milestone/>
    <credits/>
</versionInfo>
```

Annotations for the application can be defined in an annotation section. Annotations could include information such as support information and any contact information that could be independently added by third parties. An example of an annotations section is shown below.

```
<annotations>
    <annotation>Contact customer support
support@bmc.com for any urgent
issues</annotation>
    ...
</annotations>
```

The startup and shutdown sections can specify the order of starting and shutting down the components of an application. For example the DBTier may need to be started and running prior to initiating the WebTier portion of the application. These sections need not specify the precise scripts or steps to run to start or stop a particular product choice within the component (e.g., a startup/shutdown script for MySQL) because that is taken care of in the product section (described later). The order attribute specifies the order of operation and the waitForCompletion attributes specify whether to wait for the startup or shutdown of a particular component.

```
<startup>
    <description>Start the components in the
specified order</description>
    <components>
        <component id="DBTier" order="1"
waitForCompletion="true"/>
        <component id="WebTier" order="2"
waitForCompletion="true"/>
    </items>
</startup>
<shutdown>
    <description>Shutdown the components in the
specified order</description>
    <components>
        <component id="WebTier" order="1"
waitForCompletion="true"/>
        <component id="DBTier" order="2"
waitForCompletion="true"/>
    </components>
</shutdown>
```

The components section can describe the details of the individual components used to refer to tiers/modules of the application. An example of a components section is shown below.

```
<components>
    <component id="DBTier">...</component>
    <component id="WebTier">...</component>
</components>
```

The component section can describe the details of the individual components used to refer to tiers/modules of the application. The component section can define aspects like:
  Component Info: This section captures name and description for the component.
  Products: This section lists the products that can be deployed to meet the requirements of this component. Any one of these products needs to be picked up at the time of deployment.
  Networks: This section lists the networks that should be made available to this component. The networks listed here must refer to the networks defined in the network section (described earlier).
  Storages: This section lists the storage items that should be made available to this component. The storage items listed here must refer to the storages defined in the storage section (described earlier).
  Compute: This section describes the compute requirements like CPU and memory required by the component.
A component section example is shown below.

```
<component id="DBTier">
    <componentInfo>
        <name>DBTier</name>
        <description>The DB tier of the
application</description>
    </componentInfo>
    <products>
        <product id="MySQL-5">...</product>
        <product id="Oracle-10">...</product>
    </products>
    <networks>
        <network id="Production network"/>
        <network id="Management network"/>
    </networks>
    <storages>
        <storage id="DB Principal storage"/>
    </storages>
```

-continued

```
<compute>
    <numCores>4</numCores>
    <cpuFrequency unit="GHz">3</cpuFrequency>
    <memory unit="GB">2</memory>
</compute>
</component>
```

The product section can describe various aspects about a product included as a choice in a tier or component (e.g., a web tier component may have as a product choice an Apache Tomcat server on which the web tier part of the application such as a deployable web application archive (WAR) file is installed). Some of the attributes of the product section include:

Product Info: Includes general information about the product including name, description, versioning information, supported OS versions, etc.

Settings: Includes references to the globally defined variables (user input type), but only those which are applicable to this product. For example, maxThreads is a globally defined user input variable that is applicable to the Apache Tomcat Server configuration.

Startup & Shutdown: Includes the specific references to scripts/steps for starting and stopping the product. These references should have been pre-defined in the global references sections as a reference to a script, such as a shell script to start Tomcat server. The scripts in these sections would be called in the order of component startup & shutdown as specified in the application level startup and shutdown sections (see previous section).

Setup: Defines lifecycle stages for a product during the provisioning process for setting up the product. It has more finely grained stages like config, prepare (pre install scripts), deploy and finish (e.g., post-install scripts). Each of these subsections contains references to packages, scripts, and content which are predefined in the global references section. During the setup process, these are executed in the specified order (top down) to install the product. The config section may use variables referenced in the product's settings section (see above) during the deployment process with their values taken from user input to run scripts that change relevant product config files. For example, the maxThreads variable for user input can be used to change the Tomcat config file appropriately. In addition, there can be an add capacity subsection:

Add Capacity: Indicates the steps to be executed to scale out the application as it applies to this particular product.

Teardown: Defines the steps to be executed to de-provision the application as it applies to this particular product. These steps are classified into substages like config, prepare, undeploy, and finish. Each of these subsections can contain references to packages, scripts, and content which should be predefined in the global references section. During the setup process, these steps are executed in the specified order (top down) to install the product. There can be a remove capacity subsection for a corresponding add capacity subsection.

Remove Capacity: Indicates the steps to be executed to scale in the application as it applies to this particular product.

Remediation Actions: This section contains actions (which can in turn reference global scripts) which may be required to remediate certain issues, as such "Clean up temp folders".

Custom Actions: This section can be used define custom actions (which can also reference global scripts) which may be required to be used during the lifetime of the product for certain purposes, e.g., "Create a new mail box" for an Exchange application.

An example of a product section is shown below.

```
<product id="My App on Tomcat Win 2k3">
    <productInfo>
        <name>Apache Tomcat on Win 2k3</name>
        <description>My App deployed on Apache Tomcat</description>
        <vendor>Apache Software Foundation</vendor>
        <version>6.0</version>
        <fullVersion>6.0-b1</fullVersion>
        <allowedVersions>6.0.*,5.4.1.*-6.0.*</allowedVersions>
        <supportedOsVersions>Win 2k3 sp1, sp2</supportedOsVersions>
    </productInfo>
    <settings>
        <variable id="maxThreads"/>
        ...
    </settings>
    <startup>...</startup>
    <shutdown>...</shutdown>
    <setup>
        <config>...</config>
        <prepare>...</prepare>
        <deploy>...</deploy>
        <finish>...</finish>
        <addCapacity>...</addCapacity>
    </setup>
    <teardown>
        <config>...</config>
        <prepare>...</prepare>
        <undeploy>...</undeploy>
        <finish>...</finish>
        <removeCapacity>...</removeCapacity>
    </teardown>
    <remediation>
        <action id="Cleanup temp folders">...</action>
        ...
    </remediation>
    <customActions>
        <action id="Clear ARP cache">
            <reference id="clearArpCacheScript"/>
        </action>
    </customActions>
</product>
```

In the setup and teardown sections in the product definition, there can be a deploy and an undeploy section. These sections can specify the packages, images, scripts, etc. for provisioning and de-provisioning the product, respectively. The deploy and undeploy sections can also have subsections like Full Stack (Image Based), Incremental, and Standalone to represent different types of DMs. In most cases, the DM will actually flesh out (i.e., augment) the packages, scripts, image, etc. that will be required to perform deployment or un-deployment.

Full Stack: Full Stack implies a complete image/OVF package based deployment (e.g., a virtual appliance for Apache Tomcat on Win 2k3 with a particular application deployed). The Full Stack choice is mutually exclusive of the other two choices.

Standalone: This implies that the resource acquired needs to be used as is and need not be modified as part of deployment.

Incremental: Incremental deployment implies that there will be incremental steps involved for deploying the product. These incremental steps can be used to install packages/execute scripts required to deploy the product.

A deployment paths section can capture the combinations of various products which can work in tandem to define the application topology. In a case where multiple products are included for some components, then there can be multiple ways in which the application can be deployed. For example, if the WebTier component has two products (Apache Tomcat on Windows and WebLogic on Linux) and the DBTier component has two more products (MySQL on Linux and SQL Server on Windows), then there can be four possible application topologies:

1. Web tier=Apache-Tomcat on Windows and DBTier=MySQL on Linux
2. Web tier=Apache-Tomcat on Windows and DBTier=SQL Server on Windows
3. Web tier=WebLogic on Linux and DBTier=MySQL on Linux
4. Web tier=WebLogic on Linux and DBTier=SQL Server on Windows However, some of these deployments may be incompatible, unsupported, or disallowed. For example if topologies 1 and 4 are not acceptable, then the deployment paths section can be used to list the compatible/allowed/supported deployments. In the XML snippet below, each deployment path represents an allowed topology option (i.e., 2 and 3) that can be chosen by the user provisioning an instance of the application. Each deployment path can contain multiple path points each of which points to a product within a component. Each path point can have an order attribute as well, which is used to determine the order of execution of the setup/teardown steps for the products comprising the application.

```
<deploymentPaths description="Describes the
allowed/supported/compatible topologies">
    <deploymentPath
            description="Deployment Path for a
Windows shop web deployment"
            id="Apache-Tomcat-SQL-Server-
Windows">
        <pathPoint
                description=""
                id="DBTier"
                order="1"
                productId="SQL Server on
Windows"/>
        <pathPoint
                description=""
                id="WebTier"
                order="2"
                productId="Apache-Tomcat on
Windows"/>
    </deploymentPath>
    <deploymentPath
            description="Deployment Path for a
Linux shop web deployment"
            id="WebLogic-MySQL-Linux">
        <pathPoint
                description=""
                id="DBTier"
                order="1"
                productId="MySQL on Linux"/>
        <pathPoint
                description=""
                id="WebTier"
                order="2"
                productId="WebLogic on Linux"/>
    </deploymentPath>
</deploymentPaths>
```

Deployment Model

As discussed above, a DM conforms to a BP and describes specifics about a deployment intent for the application. In terms of schema it conforms to the schema of the BP. However, the DM has some different attributes such as a different root node (ddf). The DM also has attributes like the DM id and DM version information. The DM also identifies the BP id and version it conforms to. An example of a DM is shown below.

```
<ddf version="1.0" id="My App QA Deployment"
    adfId="My App Blueprint" adfVersion="1.0">
    <variables>...</variables>
    <references>...</references>
    <networks>...</networks>
    <storages>...</storages>
    <deploymentOptions>...</deploymentOptions>
    <application>...</application>
    <deploymentPaths>...</deploymentPaths>
</ddf>
```

The following bullet points identify some points of difference of the DM vis-à-vis the BP:

The DM augments the BP because it inherits, extends, overrides, and fills in the blanks for various sections defined in the BP that it is derived from, to conform closely to the environment in which the DM is to be deployed and the DM's deployment intent.

The DM can define resource pool(s) and matching criteria based on which to acquire suitable compute, network, and storage resources. This can enable a matching resource to be made available automatically from the resource pool at runtime. The DM can also define a capability to re-use the same machine/resource for the web tier and DB tier or use different machines for these tiers depending on the associated resource pools.

A DM can contain more detailed provisioning steps for a product at various lifecycle stages like Deploy etc.

A DM can inherit, extend and override variable definitions from the BP.

A DM can inherit and extend information in the references section of a BP.

A DM has some restrictions by virtue of its conformance to a BP. For example a DM cannot change the topology in terms of the number of tiers identified in a BP.

Variables Section of Deployment Model

As stated above, the variables specified in the BP are inherited by the conforming DM. The variables can be overridden in the DM document. An example is shown below, where the adminEmail variable has been overridden, and its value is set to qa@bmc.com to reflect the admin email for this QA deployment intent, instead of the admin@bmc.com value that was set in the BP. Additionally, some new variables, which were not a part of the BP, can also get added to the augmented model from the DM. An example is shown below, where a new variable called logLevel has been added to the DM. The DM can also make use of the runtime variables during the deployment process to pass context across tiers. For example, when the DBTier is provisioned, the db tier host name is stored in the dbHost runtime variable and is set to the host name of the resource/ server on which the db tier was provisioned. The value of this variable only becomes known at the deployment time when a matching resource is obtained from the resource pool. Later during the provisioning of the WebTier this variable can be accessed and the appropriate configuration in its db configuration files to point to the db can be obtained.

```
<variables>
    <variable
        description="Administrator email-ID"
        id="adminEmail"
        type="xs:string"
        isUserInput="false"
        isRuntime="false">
        qa@bmc.com
    </variable>
    <variable
        description="Level of logging"
        id="logLevel"
        type="xs:string"
        isUserInput="false"
        isRuntime="true">
        Debug
    </variable>
    ...
</variables>
```

References Section of Deployment Model

In a similar manner described for the variables section the references specified in the BP pointing to packages, scripts, other content may be inherited by the conforming DM. References can be added to in the DM document if the DM has specific need for additional scripts, packages, etc. In some cases because the DM actually details out the precise provisioning steps for deployment intent, there are likely to be new references.

References Section of Deployment Model

The network and storage definitions can similarly be defined or refined by the DM from the information inherited from the BP. This may be needed if the deployment intent requires a definition of new network and storage information which was not a part of the BP. For example, a QA deployment can require a test network which was not defined as part of the BP (because the BP only had DMZ, production, and management networks).

Product Section of Deployment Model

The Product section in the DM can override the compute, network and storage requirements as specified in the BP to better meet the deployment intent needs. The example below illustrates overriding the network requirements of the WebTier product for a QA deployment (i.e., BP specifies that the WebTier needs access to DMZ network, management network and production network, however for the QA DM, only the Test network is required/desired). Similar customization can be done for storage and compute resources. A QA DM may override compute constraints by specifying lower CPU, memory requirements whereas a production deployment may override the same by specifying higher bounds.

```
<component id="WebTier">
    ...
    <products>
        <product id="Tomcat-5">...</product>
    </products>
    <networks>
```

```
        <network id="Test network"/>
    </networks>
    ...
</component>
```

Setup and Teardown Section of Deployment Model

The deployment related lifecycle stage deploy (and undeploy) that is specified in the BP may not specify detailed steps to provision an application, leaving it to the conforming DMs to fill in the missing details. Some options are shown below relative to the three types of setup discussed above.

For example a DM can specify a full stack based (image/ OVF, et. al.) deployment. Shown below, a "bare metal" device resource from appropriate resource pool is selected and then deploy will provision the Apache Tomcat Windows OS image on the selected device.

```
<setup>
    <config>...</config>
    <prepare>...</prepare>
    <deploy>
        <fullStack>
            <resourcePool>... Bare Metal Device
Resource Pool related query ...</resourcePool>
            <reference id="Apache-Tomcat-Windows-
OS-Image"/>
        </fullStack>
        <standalone/>
        <incremental/>
    </deploy>
    <finish>...</finish>
    <addCapacity>...</addCapacity>
</setup>
```

In the DM, an incremental approach to deploying the product could also be used. For example, as illustrated below a Linux OS resource is obtained from an appropriate resource pool and then the Apache Tomcat Package can be installed on it and subsequently deploy the WAR. In the finish phase, the Data Source setup script could be executed. This action would require the host name of the db be set in the context variable and passed to the script.

```
<setup>
    <config>...</config>
    <prepare>...</prepare>
    <deploy>
        <fullStack/>
        <standalone/>
        <incremental>
            <resourcePool>Linux OS Resource Pool
related query </resourcePool>
            <reference id="Apache-Tomcat-
Package"/>
            <reference id="MyApp-War-Package"/>
        </incremental>
    </deploy>
    <finish>
        <reference id="dataSourceSetupScript"/>
        ...
    </finish>
    ...
</setup>
```

Resource Pool Selection from Deployment Model

The DM can associate the logical compute, network, and storage definitions as defined in the BP with the resource pools that will, at deploy time, supply physical resources to meet the product resource requirements. Examples include load balanced IPs (network pool), commodity disks (storage pool), bare metal devices, managed servers, VMs, etc. (compute resource pools).

Network Resource Pool from Deployment Model

Below is an example of how the network resource pool defined in the DM can extend the definition in the BP to add a reference to a network resource pool. The details of the resourcePool tag are explained in a subsequent section.

```
<networks>
    <network id="DMZNetwork">
        ...
        <resourcePool id="myIpPool"
                type="loadBalancedIPs"
                reuseObtainedResource="false"
                classOfService="Bronze">
            ... resource query ...
        </resourcePool>
        ...
    </network>
    ...
</networks>
```

Storage Resource Pool from Deployment Model

Below is an example of the storage resource pool defined in the DM which can extend the definition in the BP to add a reference to a storage resource pool. The details of the resourcePool tag are explained in the next section.

```
<storages>
    <storage id="DB Principal storage">
        ...
        <resourcePool id="myCommodityStoragePool"
                type="nfsAndWindows"
                reuseObtainedResource="false"
                classOfService="Bronze">
            ... resource query ...
        </resourcePool>
        ...
    </storage>
</storages>
```

Compute Resource Pool from Deployment Model

Multiple resource pool reference specifications can be defined within the product deploy section (Full Stack, Standalone or Incremental). The attributes specified can include:

Id and Type Identifier and type of referenced compute resource pool, like a managed servers pool which includes Linux servers Reuse Obtained Resource: This flag specifies whether an already obtained resource from the same pool is to be re-used. This is useful, for example in a QA DM that places both web and DB tier on the same machine (reuseObtainedResource="true") while a production deployment may need separate machines for individual tiers (reuseObtainedResource="false").

Resource Query: The resource query is used to select appropriate resource, from the resource pool by specifying matching criteria. Some of this criteria is composed implicitly, e.g., the product specifies OS supported versions (Win 2k3 sp 1), compute requirements (2 GB RAM, 4 Cores, 3 GHz), and these are incorporated automatically within the resource query. Besides this one can specify a query clause explicitly such as 'os.flavor="Ubuntu" and os.installedPackages contains ('blah')'

Class of Service: Multiple resource pools can be provided with an associated class of service and during provisioning the user class of service requested will determine which pool definition to use—e.g. a Gold level pool may have HA/Failover enabled while a Bronze level pool may not Local Criteria: In addition to the resource query, other local criteria may be checked before actually using the resource. This can take the form of running referenced scripts (defined in the global references section)

```
<resourcePool id="linuxServersInPune"
        type="managedServers"
        reuseObtainedResource="false"
        classOfService="Silver">
    <resourceQuery type="oql">
        os.flavor = "Ubuntu" and
        os.installedPackages contains ('blah')
    </resourceQuery>
    <localCriteria>
        <reference
            id="pingManagementServerIPScript"/>
        ...
    </localCriteria>
</resourcePool>
```

Augmentation (Via Reference) of Blueprints and Deployment Models

As described above an augmentation approach to BP and DM design can allow for easier maintenance of general and then more specific information. In one embodiment, the model may reference standard BPs and DMs in specific BPs or DMs and then perform an augmentation step (taking into account an order of precedence) to add application specific steps, packages, etc. These references could be implemented in one embodiment as shown in the following examples for BP referencing and then DM referencing in that order.

```
<component id="MyWebTier">
    <externalComponentReference
        id="StandardJavaWebTier"
        adfId="Standard Java Web Tier Blueprint"
        adfVersion="1.0"/>
    ... Override aspects ...
</component>
<component id="MyWebTier">
    <externalComponentReference
        id="StandardJavaWebTier"
        ddfId="Standard Java Web Tier Linux Deployment"
        ddfVersion="1.0"/>
    ... Override aspects like deploying WAR...
</component>
```

Product/Application Monitoring within a Blueprint and Deployment Model

Monitoring is that aspect of systems management that could also be included in the BP. A monitoring section of a BP could help define the hooks to enable a "look-into" the application/product/resource via a monitoring product. The hooks could be used by a point product (NGP, for example) to deploy, administer, and receive data from monitoring agents which might be deployed/provisioned along with the provisioned application. Attributes for the monitoring solution could be based on predefined attributes (templates) or discovered attributes (signatures). The BP does not have to define the fine grain attributes of what data constitutes the monitoring aspects or the actual remediation which is a consequence of the monitoring. Each of these could be handled by the point product and not defined specifically by the BP. For example NGP can execute remediation scripts against the cell or trigger a work-flow using a remediation capable product. In particular, if the resources identified by the BP or DM collectively (i.e., the augmented model) have available monitoring solutions these available solutions could be identified and instantiated as part of the provisioning act. The BP could abstract the monitoring to a "signature" or to a monitoring template as disclosed in the following example XML fragments.

```
<MonitoringSection>
    <Signature>
        <Param>
            <Name>Product</Name>
            <Value>Oracle database
            engine</Value>
        </Param>
        <Param>
            <Name>version</Name>
            <Value>11g</Value>
        </Param>
        <Param>
            <Name>Intent</Name>
            <Value>OLAP cubes</Value>
        </Param>
    </Signature>
</MonitoringSection>
<MonitoringSection>
    <!-- We can reuse a Monitoring template. This is
    not a configuration template -->
    <MonitoringTemplate
    ref ="petstore_oracle_db_Remediation"/>
</MonitoringSection>
```

The Signature element can define the abstraction for the monitoring. The point product can consume this signature to identify an existing template or to discover a new template. The names of the parameters and the needed values can be guided by the content (template/monitor configuration) author. Monitoring within the BP can be defined at least at three levels—for the application, the products in the component collection(s) and the resource that is allocated. Depending on the approach, the BP author either defines the abstraction—signature, the monitoring templates, or the individual events. Remediation can also be guided by the model if not already covered by the monitoring point product reference.

Compliance Policies within a Blueprint and Deployment Model

Compliance policies are also a part of application management, and can be defined in the BP/DM for the products comprising it, the underlying infrastructure (like the servers on which the products are deployed), and possibly at the application level as well. As the BP and DMs capture the application, its tiers, products within those tiers, deployment intent, and the resource pools (and hence resource types or servers on which to deploy the products), it may also be possible to define the compliance section at those various levels. There are several compliance guidelines or standards that organizations need to adhere to for various reasons like industry standards, regulatory, or financial reasons, etc. Besides industry standard compliance models (e.g., DISA, CIS, PCI DSS, SOX, etc.) organizations may want to specify their own compliance policies.

Change Tracking within a Blueprint and Deployment Model

Change tracking and incident management definitions are also possible in the BP/DM document to define a way to manage the changes for the associated application. Change tracking can be enabled at application, product, or at more granular levels. A change management application can enable an organization's service desk to create, implement, and manage change requests. It can provide a system of planning, scheduling, implementing, and tracking changes that need to be completed within the organization. Incident management can be reactive, and is typically initiated in response to a customer call or automated event. An incident is any event that is not part of the standard operation of a service and that causes an interruption to or a reduction in the quality of that service.

Additionally, task management can be a component of a change management solution. Task management consists of task templates that let an administrator create individual work items that may be reused. Task administrators can create these task templates that the change implementer could then reuse in multiple change requests. Multiple tasks could be associated to a change or incident instance or type. Tasks can be created from the task template and an order in which they should be executed can be defined. By including this capability in the augmented BP/DM deployment solution, standard corporate policies regarding statically provisioned applications can be applied to dynamically provisioned applications.

Figure 3:
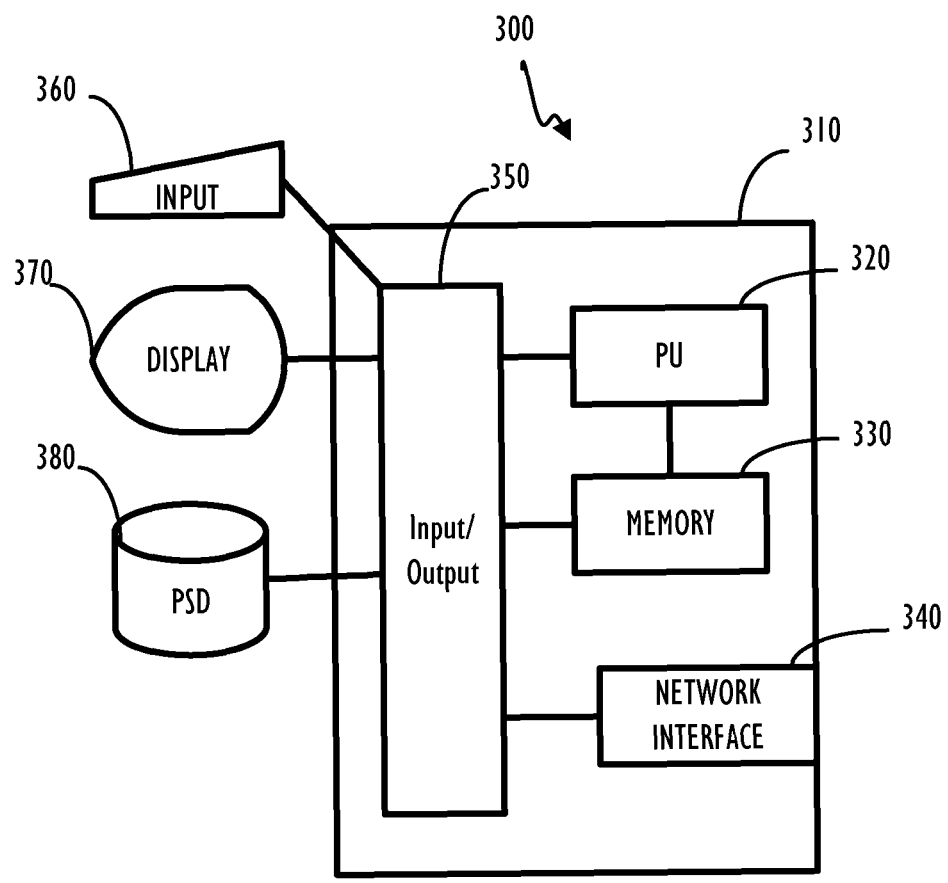
FIG. 3 shows, in block diagram form, an example computing device comprising a program control device.

Referring now to FIG. 3, an example of a computing device 300 is shown. One or more example computing devices 300 may be included in a mainframe computer (not shown) or a standard distributed computer. Example computing device 300 comprises a programmable control device 310 which may be optionally connected to input 360 (e.g., keyboard, mouse, touch screen, etc.), display 370 or program storage device (PSD) 380 (sometimes referred to as a direct access storage device DASD). Also, included with program device 310 is a network interface 340 for communication via a network with other computing and corporate infrastructure devices (not shown). Note network interface 340 may be included within programmable control device 310 or be external to programmable control device 310. In either case, programmable control device 310 will be communicatively coupled to network interface 340. Also note, program storage device 380 represents any form of non-volatile storage including, but not limited to, all forms of optical and magnetic storage elements including solid-state storage.

Program control device 310 may be included in a computing device and be programmed to perform methods in accordance with this disclosure (e.g., illustrated in FIG. 2). Program control device 310 comprises a processor unit (PU) 320, input-output (I/O) interface 350 and memory 330. Processing unit 320 may include any programmable controller device including, for example, processors of an IBM mainframe (such as a quad-core z10 mainframe microprocessor). Alternatively, in non-mainframe systems examples of processing unit 320 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 330 may include one or more memory modules and comprise random access memory (RAM), read only memory (ROM), programmable read only memory (PROM), programmable read-write memory, and solid state memory. One of ordinary skill in the art will also recognize that PU 320 may also include some internal memory including, for example, cache memory.

Aspects of the embodiments are described as a method of control or manipulation of data, and may be implemented in one or a combination of hardware, firmware, and software.

Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 2 may be performed in an order different from that disclosed here. Alternatively, some embodiments may combine the activities described herein as being separate steps or combine the logical systems described herein as being separate computers into one physical computer. Similarly, one or more of the described steps may be omitted, depending upon the specific operational environment the method is being implemented in. In addition, acts in accordance with FIG. 2 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of managing and provisioning computer applications in an information technology (IT) environment, the method comprising:

obtaining, by at least one processor, a blueprint including a plurality of blueprint attributes of a computer application that are arranged in a schema;

obtaining, by the at least one processor, a deployment model corresponding to the computer application and associated with the blueprint, the deployment model including a plurality of deployment attributes of the computer application that are arranged in the schema, the deployment attributes including first attributes that are also provided in the blueprint and second attributes not provided in the blueprint, the deployment attributes including run-time variables;

creating, by the at least one processor, an augmented model based on the schema of the blueprint and the deployment model by automatically augmenting the blueprint with at least some attributes provided in the deployment model, the augmenting including overriding corresponding blueprint attributes with the first attributes of the deployment model, adding the second attributes of the deployment model to the blueprint attributes, and including the run-time variables in the augmented model;

determining, by the at least one processor, computer resources capable of supporting the augmented model; and provisioning, by the at least one processor, an instance of the computer application based on the augmented model in response to determining the computer resources capable of supporting the augmented model, wherein the provisioning includes:

deploying, by the at least one processor, a first tier of the computer application based on the augmented model;

determining, by the at least one processor, values for the run-time variables based on the deployment of the first tier;

updating, by the at least one processor, a portion of the augmented model relating to a second tier of the computer application based on the determined values of the runtime variables, and deploying, by the at least one processor, the second tier of the computer application based on the determined values of the runtime variables within the portion of the updated augmented model.

2. The method of claim 1, further comprising:

receiving, by the at least one processor, user input information; and augmenting, by the at least one processor, at least one of the blueprint attributes and the deployment attributes with the user input information.

3. The method of claim 1, wherein at least one of the blueprint attributes and the deployment attributes relate to at least one compliance policy.

4. The method of claim 3, wherein the at least one compliance policy includes policies associated with regulatory compliance, security compliance or industry standard compliance.

5. The method of claim 1, further comprising:

receiving, by the at least one processor, an indication that the instance of the computer application has completed; and decommissioning, by the at least one processor, the computer application based at least in part on the augmented model.

6. The method of claim 5, further comprising: returning, by the at least one processor, the determined computer resources to one or more resource pools.

7. The method of claim 1, wherein the blueprint attributes include an attribute of a deployment path, the deployment path defining supported topologies for deploying the instance of the computer application.

8. The method of claim 1, wherein the schema includes a extensible markup language (XML) format.

9. The method of claim 8, wherein the blueprint and the deployment model are separate XML files.

10. A non-transitory computer-readable medium storing instructions that when executed cause at least one processor to manage and provision computer applications in an information technology (IT) environment, the instructions, when executed by the at least one processor, further cause the at least one processor to perform the steps of:
   obtaining a blueprint including a plurality of blueprint attributes of a computer application that are arranged in a schema;
   obtaining a deployment model corresponding to the computer application and associated with the blueprint, the deployment model including a plurality of deployment attributes of the computer application that are arranged in the schema, the deployment attributes including first attributes that are also provided in the blueprint and second attributes not provided in the blueprint, the deployment attributes including run-time variables;
   creating an augmented model based on the schema of the blueprint and the deployment model by automatically augmenting the blueprint with at least some attributes provided in the deployment model, the augmenting including overriding corresponding blueprint attributes with the first attributes of the deployment model, adding the second attributes of the deployment model to the blueprint attributes, and including the run-time variables in the augmented model;
   determining computer resources capable of supporting the augmented model; and
   provisioning an instance of the computer application based on the augmented model in response to the determination of the computer resources capable of supporting the augmented model, wherein the provisioning includes:
      deploying a first tier of the computer application based on the augmented model;
      determining values for the run-time variables based on the deployment of the first tier;
      updating a portion of the augmented model relating to a second tier of the computer application based on the determined values of the run-time variables; and
      deploying the second tier of the computer application based on the determined values of the run-time variables within the portion of the updated augmented model.

11. The non-transitory computer-readable medium of claim 10, wherein at least one of the blueprint attributes and the deployment attributes relate to at least one compliance policy.

12. The non-transitory computer-readable medium of claim 11, wherein the at least one compliance policy includes policies associated with regulatory compliance, security compliance or industry standard compliance.

13. The non-transitory computer-readable medium of claim 10, wherein the schema includes a common data format.

14. A system of managing and provisioning computer applications in an information technology (IT) environment, the system comprising:
   a provisioning engine including at least one at least one processor and a storage device having executable instructions; and
   a resource pool including a compute resource pool and a storage resource pool,
   the instructions, when executed by the at least one processor, cause the at least one processor to perform the steps of:
      obtaining a blueprint of a computer application, the blueprint including a plurality of blueprint attributes that are arranged in a schema,
      obtaining a deployment model corresponding to the computer application and associated with the blueprint, the deployment model including a plurality of deployment attributes of the computer application that are arranged in the schema, the deployment attributes including first attributes that are also provided in the blueprint and second attributes not provided in the blueprint, the deployment attributes including run-time variables,
      creating an augmented model based on the schema of the blueprint and the deployment model by automatically augmenting the blueprint with at least some attributes provided in the deployment model, the augmenting including overriding corresponding blueprint attributes with the first attributes of the deployment model, adding the second attributes to the blueprint attributes, and including the run-time variables in the augmented model,
      determining computer resources capable of supporting the augmented model from at least one of the compute resource pool and the storage resource pool,
      provisioning an instance of the computer application based on the augmented model in response to the determination of the computer resources capable of supporting the augmented model, wherein the provisioning includes:
         deploying a first tier of the computer application based on the augmented model;
         determining values for the run-time variables based on the deployment of the first tier;
         updating a portion of the augmented model relating to a second tier of the computer application based on the determined values of the run-time variables; and
         deploying the second tier of the computer application based on the determined values of the run-time variables within the portion of the updated augmented model.

15. The method of claim 1, wherein the augmenting step is based on precedence rules that identify an order of which attributes are overridden and added.

16. The method of claim 1, wherein the augmented model includes application monitoring attributes defining a monitoring template for monitoring the computer application, the method further comprising:
   provisioning, by the at least one processor, during the provisioning of the instance of the computer application, a monitoring agent on the computer application based on the monitoring template of the augmented model, the monitoring agent configured to collect data from the computer application.

17. The non-transitory computer-readable medium of claim 10, wherein the augmented model includes application monitoring attributes defining a monitoring template for monitoring the computer application, wherein the instructions, when executed by the at least one processor, further cause the at least one processor to perform the step of:
   provisioning, during the provisioning of the instance of the computer application, a monitoring agent on the computer application based on the monitoring template of the augmented model, the monitoring agent configured to collect data from the computer application.

18. The system of claim 14, wherein the augmented model includes application monitoring attributes defining a monitoring template for monitoring the computer application, wherein the instructions, when executed by the at least one processor, further cause the at least one processor to perform the step of:

provisioning, during the provisioning of the instance of the computer application, a monitoring agent on the computer application based on the monitoring template of the augmented model, the monitoring agent configured to collect data from the computer application.

19. The system of claim 18, wherein the application monitoring attributes include key performance indicators (KPIs).

* * * * *

UNITED STATES PATENT AND TRADEMARK OFFICE
CERTIFICATE OF CORRECTION

PATENT NO. : 9,805,322 B2
APPLICATION NO. : 12/847949
DATED : October 31, 2017
INVENTOR(S) : Kelkar et al.

Page 1 of 1

It is certified that error appears in the above-identified patent and that said Letters Patent is hereby corrected as shown below:

On the Title Page

In Column 1, Item (75), in "Inventors", Line 1, delete "IN (US);" and insert -- (IN); --, therefor.

In the Claims

In Column 21, Line 65, Claim 1, delete "by at" and insert -- by the at --, therefor.

In Column 22, Line 38, Claim 1, delete "variables, and" and insert -- variables; and --, therefor.

In Column 22, Line 63, Claim 6, delete "returning," and insert the same at Line 64 before "by the".

In Column 23, Line 3, Claim 8, delete "includes a" and insert -- includes an --, therefor.

In Column 23, Line 65, Claim 14, delete "including at least one" and insert -- including --, therefor.

Signed and Sealed this
Twentieth Day of March, 2018

Andrei Iancu
*Director of the United States Patent and Trademark Office*